(12) United States Patent
Kim et al.

(10) Patent No.: US 7,854,009 B2
(45) Date of Patent: Dec. 14, 2010

(54) METHOD OF SECURING ACCESS TO IP LANS

(75) Inventors: Moom Ju Kim, Wappingers Falls, NY (US); William G. White, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 1143 days.

(21) Appl. No.: 10/459,964

(22) Filed: Jun. 12, 2003

(65) Prior Publication Data

US 2005/0005110 A1  Jan. 6, 2005

(51) Int. Cl.
*G06F 21/06* (2006.01)
*G06F 21/20* (2006.01)
*G06F 17/30* (2006.01)

(52) U.S. Cl. .............................. 726/26; 726/2; 726/27; 713/162; 713/182; 713/1; 713/150

(58) Field of Classification Search .................. None
See application file for complete search history.

(56) References Cited

U.S. PATENT DOCUMENTS

| | | | |
|---|---|---|---|
| 5,136,505 A | 8/1992 | Inamori et al. | |
| 5,398,302 A | 3/1995 | Thrift | |
| 5,499,366 A | 3/1996 | Rosenberg et al. | |
| 5,737,734 A | 4/1998 | Schultz | |
| 5,794,178 A | 8/1998 | Caid et al. | |
| 5,819,263 A | 10/1998 | Bromley et al. | |
| 5,878,423 A | 3/1999 | Anderson et al. | |
| 5,893,092 A | 4/1999 | Driscoll | |
| 5,899,991 A | 5/1999 | Karch | |
| 5,956,708 A | 9/1999 | Dyko et al. | |
| 5,956,711 A | 9/1999 | Sullivan et al. | |
| 5,956,740 A | 9/1999 | Nosohara | |
| 5,987,457 A | 11/1999 | Ballard | |

(Continued)

FOREIGN PATENT DOCUMENTS

EP    0851368 A2    1/1998

(Continued)

OTHER PUBLICATIONS

Device-Transparent Network-Layer Handoff for Micro-Mobility Fanglu Guo; Tzi-cker Chiueh. IEEE International Symposium on Modeling, Analysis, 2009—Citeseer.*

(Continued)

*Primary Examiner*—Syed A. Zia
(74) *Attorney, Agent, or Firm*—Andrea Bauer; Hoffman Warnick LLC

(57) ABSTRACT

Protection against spoofing is provided in a LAN having at least two service classes, where one service class includes allows access to the LAN, the internet, and the intranet containing the LAN and a more limited service class which allows access to the LAN and the internet but not the intranet databases. A user gains access to the LAN using his or her ID which identifies the user's access level. To prevent limited access users from gaining access to the intranet by changing addresses, the system continuously performs periodic checks for address changes. If there is an address change, the port assigned to, or used by the user, is disabled throwing the user off the LAN prior to his or her obtaining the requested data.

17 Claims, 7 Drawing Sheets

U.S. PATENT DOCUMENTS

| | | | |
|---|---|---|---|
| 5,991,713 | A | 11/1999 | Unger et al. |
| 6,005,860 | A | 12/1999 | Anderson et al. |
| 6,008,817 | A | 12/1999 | Gilmore, Jr. |
| 6,041,326 | A | 3/2000 | Amro et al. |
| 6,055,528 | A | 4/2000 | Evans |
| 6,065,026 | A | 5/2000 | Cornelia et al. |
| 6,081,774 | A | 6/2000 | De Hita et al. |
| 6,085,162 | A | 7/2000 | Cherny |
| 6,085,186 | A | 7/2000 | Christianson et al. |
| 6,094,647 | A | 7/2000 | Kato et al. |
| 6,102,969 | A | 8/2000 | Christianson et al. |
| 6,111,572 | A | 8/2000 | Blair et al. |
| 6,141,005 | A | 10/2000 | Hetherington et al. |
| 6,163,785 | A | 12/2000 | Carbonell et al. |
| 6,169,986 | B1 | 1/2001 | Bowman et al. |
| 6,219,646 | B1 | 4/2001 | Cherny |
| 6,226,638 | B1 | 5/2001 | Okura et al. |
| 6,237,011 | B1 | 5/2001 | Ferguson et al. |
| 6,240,408 | B1 | 5/2001 | Kaufman |
| 6,240,412 | B1 | 5/2001 | Dyko et al. |
| 6,259,933 | B1* | 7/2001 | Bambridge et al. .......... 455/557 |
| 6,262,725 | B1 | 7/2001 | Hetherington et al. |
| 6,275,789 | B1 | 8/2001 | Moser et al. |
| 6,275,810 | B1 | 8/2001 | Hetherington et al. |
| 6,278,967 | B1 | 8/2001 | Akers et al. |
| 6,327,590 | B1 | 12/2001 | Chidlovskii et al. |
| 6,338,055 | B1 | 1/2002 | Hagmann et al. |
| 6,349,307 | B1 | 2/2002 | Chen |
| 6,360,196 | B1 | 3/2002 | Poznanski et al. |
| 6,424,973 | B1 | 7/2002 | Baclawski |
| 6,453,159 | B1* | 9/2002 | Lewis ......................... 455/411 |
| 6,463,430 | B1 | 10/2002 | Brady et al. |
| 6,516,312 | B1 | 2/2003 | Kraft et al. |
| 6,523,026 | B1 | 2/2003 | Gillis |
| 6,526,440 | B1 | 2/2003 | Bharat |
| 6,560,634 | B1 | 5/2003 | Broadhurst |
| 6,571,249 | B1 | 5/2003 | Garrecht et al. |
| 6,581,072 | B1 | 6/2003 | Mathur et al. |
| 6,602,300 | B2 | 8/2003 | Ushioda et al. |
| 6,604,099 | B1 | 8/2003 | Chung et al. |
| 6,604,101 | B1 | 8/2003 | Chan et al. |
| 6,629,097 | B1 | 9/2003 | Keith |
| 6,636,848 | B1 | 10/2003 | Aridor et al. |
| 6,643,661 | B2 | 11/2003 | Polizzi et al. |
| 6,654,734 | B1 | 11/2003 | Mani et al. |
| 6,711,568 | B1 | 3/2004 | Bharat et al. |
| 6,718,333 | B1 | 4/2004 | Matsuda |
| 6,738,764 | B2 | 5/2004 | Mao et al. |
| 6,738,767 | B1 | 5/2004 | Chung et al. |
| 6,766,316 | B2 | 7/2004 | Caudill et al. |
| 6,772,150 | B1 | 8/2004 | Whitman et al. |
| 6,778,979 | B2 | 8/2004 | Grefenstette et al. |
| 6,813,496 | B2* | 11/2004 | Numminen et al. ......... 455/445 |
| 6,829,599 | B2 | 12/2004 | Chidlovskii |
| 6,836,777 | B2 | 12/2004 | Holle |
| 6,901,399 | B1 | 5/2005 | Corston et al. |
| 6,928,432 | B2 | 8/2005 | Fagan et al. |
| 6,941,294 | B2 | 9/2005 | Flank |
| 6,952,691 | B2 | 10/2005 | Drissi et al. |
| 7,027,974 | B1 | 4/2006 | Busch et al. |
| 7,039,625 | B2 | 5/2006 | Kim et al. |
| 7,051,023 | B2 | 5/2006 | Kapur et al. |
| 7,117,199 | B2 | 10/2006 | Frank et al. |
| 7,124,364 | B2 | 10/2006 | Rust et al. |
| 7,127,456 | B1 | 10/2006 | Brown et al. |
| 7,136,845 | B2 | 11/2006 | Chandrasekar et al. |
| 7,174,564 | B1* | 2/2007 | Weatherspoon et al. ......... 726/2 |
| 7,197,508 | B1 | 3/2007 | Brown, III |
| 7,318,057 | B2 | 1/2008 | Aridor et al. |
| 2001/0021947 | A1 | 9/2001 | Kim |
| 2002/0002452 | A1 | 1/2002 | Christy et al. |
| 2002/0007364 | A1 | 1/2002 | Kobayashi et al. |
| 2002/0016787 | A1 | 2/2002 | Kanno |
| 2002/0042789 | A1 | 4/2002 | Michalewicz et al. |
| 2002/0059289 | A1 | 5/2002 | Wenegrat et al. |
| 2002/0091671 | A1 | 7/2002 | Prokoph |
| 2002/0095594 | A1* | 7/2002 | Dellmo et al. .............. 713/200 |
| 2002/0095621 | A1 | 7/2002 | Lawton |
| 2002/0107992 | A1 | 8/2002 | Osbourne et al. |
| 2002/0156776 | A1 | 10/2002 | Davallou |
| 2002/0156792 | A1 | 10/2002 | Gombocz et al. |
| 2002/0184206 | A1 | 12/2002 | Evans |
| 2003/0126136 | A1 | 7/2003 | Omoigui |
| 2003/0142128 | A1 | 7/2003 | Reulein et al. |
| 2003/0144982 | A1 | 7/2003 | Reulein et al. |
| 2003/0149687 | A1 | 8/2003 | Brown et al. |
| 2003/0177111 | A1 | 9/2003 | Egendorf et al. |
| 2003/0225722 | A1 | 12/2003 | Brown et al. |
| 2003/0225747 | A1 | 12/2003 | Brown et al. |
| 2004/0019588 | A1 | 1/2004 | Doganata et al. |
| 2004/0024745 | A1 | 2/2004 | Jeng et al. |
| 2004/0024748 | A1 | 2/2004 | Brown et al. |
| 2004/0030690 | A1 | 2/2004 | Teng et al. |
| 2004/0044669 | A1 | 3/2004 | Brown et al. |
| 2004/0111408 | A1 | 6/2004 | Caudill et al. |
| 2004/0181525 | A1 | 9/2004 | Itzhak et al. |
| 2004/0205656 | A1 | 10/2004 | Reulein et al. |
| 2004/0214570 | A1* | 10/2004 | Zhang et al. .............. 455/426.2 |
| 2004/0220905 | A1 | 11/2004 | Chen et al. |
| 2004/0249808 | A1 | 12/2004 | Azzam et al. |
| 2004/0254920 | A1 | 12/2004 | Brill et al. |
| 2005/0055341 | A1 | 3/2005 | Haahr et al. |
| 2005/0065773 | A1 | 3/2005 | Huang et al. |
| 2005/0065774 | A1 | 3/2005 | Doganata et al. |
| 2006/0036588 | A1 | 2/2006 | Frank et al. |
| 2006/0191996 | A1* | 8/2006 | Drummond et al. ......... 235/379 |
| 2009/0036159 | A1* | 2/2009 | Chen ....................... 455/556.1 |

FOREIGN PATENT DOCUMENTS

| | | |
|---|---|---|
| EP | 0964344 A2 | 12/1999 |
| EP | 1072984 A2 | 1/2001 |
| JP | 10187752 A | 7/1998 |
| JP | 11219368 A | 8/1999 |
| WO | 0201400 A1 | 1/2002 |

OTHER PUBLICATIONS

Sequence number-based MAC address spoof detection, F Guo, T Chiueh—Recent Advances in Intrusion Detection, 2006—Springer.*

IBM Technical Disclosure Bulletin; "Language-Sensitive Search Techniques", vol. 35, No. 4A, pp. 306-307, Sep. 1992.

IBM Technical Disclosure Bulletin; "X/Open Message Translation Tool (Xaltu) for AIX", vol. 38, No. 3, pp. 405-410, Mar. 1995.

Lange et al; Program; "Multilingual Access to Web Resources: An Overview", pp. 43-58, Jan. 2000.

M. Lyon; World Patent Information; "Language Related Problems in the IPC and Search System Using Natural Language", vol. 21, Issue 2, pp. 89-95, Jun. 1999.

A. Dusterhoft et al.; Proceedings, 11th International Workshop on Database and Expert Systems Applications; "A Heuristic Approach for Recognizing a Document's Language Used for the Internet Search Engine GETESS", pp. 133-137, Sep. 4-8, 2000, London.

Mini-Macro Systems; "Design and Implementation of Data Acquisition in WWW-based Chinese-English Search Engine", vol. 20, No. 5, pp. 339-342 (only Abstract on p. 342 is in English), May 1999.

A. Mujoo et al.; Electronic Commerce and Web Technologies, First International Conference, EC-Web 2000, Proceedings, Lecture Notes; "A Search Engine for Indian Languages", pp. 349-358, Sep. 4-6, 2000, London.

J. Dimec et al.; Medical Informatics Europe '99; "WWW Search Engine for Slovenian and English Medical Documents", pp. 547-552.

E. Kolmanovskaia; First IEEE/POPOV Workshop on Internet Technologies and Services Proceedings; "Yandex Ru—Search and Research Engine", pp. 157-158, Oct. 1999.

Doganata et al., "dBlue—An Advanced Enterprise Information Search and Delivery System", WebSphereDevelopersJournal.com, http://websphere.sys-con.com/read/43255.htm, Jan. 1, 2000, 18 pages.

Office Action, U.S. Appl. No. 10/066,346, Date Mailed Jun. 21, 2004, 11 pages.

Final Office Action, U.S. Appl. No. 10/066,346, Date Mailed Feb. 4, 2005, 8 pages.

Notice of Allowance, U.S. Appl. No. 10/066,346, Date Mailed May 26, 2005, 7 pages.

Office Action, U.S. Appl. No. 11/151,047, Date Mailed Aug. 15, 2007, 15 pages.

Final Office Action, U.S. Appl. No. 11/151,047, Date Mailed Jan. 29, 2008, 8 pages.

Notice of Allowance, U.S. Appl. No. 11/151,047, Date Mailed May 8, 2008, 4 pages.

Office Action, U.S. Appl. No. 10/664,449, Date Mailed Apr. 4, 2007, 11 pages.

Final Office Action, U.S. Appl. No. 10/664,449, Date Mailed Oct. 25, 2007, 10 pages.

Office Action, U.S. Appl. No. 10/664,449, Date Mailed Jul. 25, 2008, 12 pages.

Office Action, U.S. Appl. No. 10/664,449, Date Mailed Mar. 11, 2009, 14 pages.

Final Office Action, U.S. Appl. No. 10/664,449, Date Mailed Nov. 20, 2009, 11 pages.

Office Action, U.S. Appl. No. 10/664,449, Date Mailed Apr. 15, 2010, 20 pages.

Office Action, U.S. Appl. No. 10/664,450, Date Mailed Dec. 12, 2006, 24 pages.

Office Action, U.S. Appl. No. 10/664,450, Date Mailed Jun. 13, 2007, 28 pages.

Office Action, U.S. Appl. No. 10/664,450, Date Mailed Apr. 17, 2008, 36 pages.

Office Action, U.S. Appl. No. 10/664,450, Date Mailed Nov. 24, 2008, 37 pages.

Office Action, U.S. Appl. No. 10/664,450, Date Mailed Dec. 18, 2009, 38 pages.

U.S. Appl. No. 10/209,619, filed Jul. 31, 2002, Notice of Allowance and Fees Due dated Sep. 8, 2006.

U.S. Appl. No. 10/209,619, filed Jul. 31, 2002, Advisory Action dated Mar. 31, 2006.

U.S. Appl. No. 10/209,619, filed Jul. 31, 2002, Final Office Action dated Dec. 23, 2005.

U.S. Appl. No. 10/209,619, filed Jul. 31, 2002, Office Action dated Feb. 18, 2005.

U.S. Appl. No. 10/229,552, filed Aug. 28, 2002, Notice of Allowance and Fees Due dated May 19, 2006.

U.S. Appl. No. 10/229,552, filed Aug. 28, 2002, Advisory Action dated Feb. 6, 2006.

U.S. Appl. No. 10/229,552, filed Aug. 28, 2002, Advisory Action dated Nov. 15, 2005.

U.S. Appl. No. 10/229,552, filed Aug. 28, 2002, Advisory Action dated Oct. 4, 2005.

U.S. Appl. No. 10/229,552, filed Aug. 28, 2002, Final Office Action dated Jul. 27, 2005.

U.S. Appl. No. 10/229,552, filed Aug. 28, 2002, Office Action dated Jan. 4, 2005.

U.S. Appl. No. 10/302,108, filed Nov. 22, 2002, 312 Amendment dated Nov. 22, 2005.

U.S. Appl. No. 10/302,108, filed Nov. 22, 2002, Notice of Allowance and Fees Due dated Oct. 13, 2005.

U.S. Appl. No. 10/302,108, filed Nov. 22, 2002, Office Action dated May 18, 2005.

U.S. Appl. No. 10/209,112, filed Jul. 31, 2002, Notice of Allowance and Fees Due dated Dec. 23, 2004.

U.S. Appl. No. 10/157,243, filed May 30, 2002, Restriction Requirement dated Apr. 8, 2005.

U.S. Appl. No. 10/157,243, filed May 30, 2002, Office Action dated Sep. 30, 2004.

Holmes et al., "Integrating Metdata Tools with the Data Services Archive to Provide Web-based Management of Large-Scale Scientific Simulation Data", Proceedings of the 37th Annual Simulation Symposium, 2004.

Siersdorfer et al., "Restrictive Clustering and Metaclustering for Self-Organizing Document Collections", Special Interest Group On Information Retrieval, Jul. 25-29, 2004, Sheffield, South Yorkshire, UK.

Stephenson et al., "Meta Optimization: Improving Compiler Heuristics with Machine Learning", Program Language Design and Implementation, Jun. 9-11, 2003, San Diego, California.

IBM Research Disclosure, "The Nexus—a unique way to allow the sharing of objects in multiple application spaces", Feb. 2002.

Lam et al., "A Meta-Learning Approach for Text Categorization", Special Interest Group On Information Retrieval, Sep. 9-12, 2001, New Orleans, Louisiana.

Vilalta et al., "A Perspective View and Survery of Meta-Learning", Kluwer Academic Publishers, 2001, Netherlands.

Peters et al., "Multilingual access for information systems", 67th IFLA Council and General Conference, Aug. 16-25, 2001.

Ziviani et al., "Compression: A Key for Next-Generation Text Retrieval Systems", Institute of Electrical and Electronics Engineers, Nov. 2000.

Biebow et al., "Terminae: a method and a tool to build a domain ontology", Proceedings of the 11th European Workshop on Knowledge Acquisition, Modelling, and Management, 49-66, Springer Verlag, 1999.

Schiel et al., SIM—a System for Semi-Automatic Indexing of Multilingual Documents', Proceedings of the 10th International Workshop on Database and Expert Systems Application, 1999.

Jain et al., "Data Clustering: A Review", ACM Computing Surveys, vol. 31, No. 3, Sep. 1999.

Brin et al., "The Anatomy of a Large-Scale Hypertextual Web Search Engine", Computer Networks & ISDN System, vol. 30, Issue 1-7, Apr. 1998, 107-117.

Yergeau et al., "RFC2279-UTF-8, a transformation format of ISO 10646", Copyright The Internet Society, 1998.

Cooper et al., "OBIWAN—A Visual Interface for Prompted Query Refinement", Copyright 1998 by the IEEE.

Soergel, Dagobert, "Multilingual thesauri in cross-language text and speech retrieval", Working Notes of AAAI Spring Symposium on Cross Language Text and Speech Retrieval, 164-170, Stanford, California.

Vossen, Piek, "EuroWordNet: a multilingual database for information retrieval", DELOS Workshop on Cross-language Information Retrieval, Mar. 5-7, 1997, Zurich.

Lin et al., "An Automatic Indexing and Neural Network Approach to Concept Retrieval and Classification of Multilingual (Chinese-English) Documents", IEEE, 1996.

Hull et al., "Querying Across Languages: A Dictionary-Based Approach to Multilingual Information Retrieval", Special Interest Group on Information Retrieval, 1996, Zurich.

Cheung et al., "The Model-Assisted Global Query System For Multiple Databases in Distributed Enterprises", ACM Transactions on Information Systems, Jul. 1994.

Salton, G., "Automatic Processing of Foreign Language Documents", International Conference on Computational Linguistics, 1-28, 1969.

U.S. Appl. No. 10/202,564, filed Jul. 23, 2002, Notice of Allowance and Fees Due dated Oct. 20, 2009.

U.S. Appl. No. 10/202,564, filed Jul. 23, 2002, Final Office Action dated Jul. 7, 2009.

U.S. Appl. No. 10/202,564, filed Jul. 23, 2002, Office Action dated Nov. 13, 2008.

U.S. Appl. No. 10/202,564, filed Jul. 23, 2002, Final Office Action dated May 28, 2008.

U.S. Appl. No. 10/202,564, filed Jul. 23, 2002, Final Office Action dated Mar. 10, 2008.

U.S. Appl. No. 10/202,564, filed Jul. 23, 2002, Office Action dated Jul. 26, 2007.

U.S. Appl. No. 10/202,564, filed Jul. 23, 2002, Final Office Action dated Feb. 7, 2007.

U.S. Appl. No. 10/202,564, filed Jul. 23, 2002, Office Action dated Aug. 11, 2006.
U.S. Appl. No. 10/202,564, filed Jul. 23, 2002, Advisory Action dated Jan. 10, 2006.
U.S. Appl. No. 10/202,564, filed Jul. 23, 2002, Final Office Action dated Sep. 13, 2005.
U.S. Appl. No. 10/202,564, filed Jul. 23, 2002, Office Action dated Mar. 7, 2005.
U.S. Appl. No. 10/412,808, filed Apr. 11, 2003, Notice of Allowance and Fees Due dated Sep. 19, 2008.
U.S. Appl. No. 10/412,808, filed Apr. 11, 2003, Office Action dated Jan. 28, 2008.
U.S. Appl. No. 10/412,808, filed Apr. 11, 2003, Office Action dated Sep. 11, 2006.
U.S. Appl. No. 10/412,808, filed Apr. 11, 2003, Office Action dated Sep. 23, 2005.
U.S. Appl. No. 10/159,373, filed Jun. 3, 2002, Notice of Allowance and Fees Due dated Apr. 13, 2007.
U.S. Appl. No. 10/159,373, filed Jun. 3, 2002, Advisory Action dated Sep. 29, 2006.
U.S. Appl. No. 10/159,373, filed Jun. 3, 2002, Advisory Action dated Aug. 29, 2006.
U.S. Appl. No. 10/159,373, filed Jun. 3, 2002, Final Office Action dated May 23, 2006.
U.S. Appl. No. 10/159,373, filed Jun. 3, 2002, Office Action dated Dec. 6, 2005.
U.S. Appl. No. 10/159,373, filed Jun. 3, 2002, Advisory Action dated Jul. 15, 2005.
U.S. Appl. No. 10/159,373, filed Jun. 3, 2002, Final Office Action dated Apr. 20, 2005.
U.S. Appl. No. 10/159,373, filed Jun. 3, 2002, Office Action dated Oct. 18, 2004.
U.S. Appl. No. 10/180,195, filed Jun. 26, 2002, Supplemental Notice of Allowance And Fees Due dated Jan. 29, 2007.
U.S. Appl. No. 10/180,195, filed Jun. 26, 2002, Notice of Allowance and Fees Due dated Nov. 2, 2006.
U.S. Appl. No. 10/180,195, filed Jun. 26, 2002, Office Action dated Jul. 7, 2006.
U.S. Appl. No. 10/180,195, filed Jun. 26, 2002, Advisory Action dated Sep. 2, 2005.
U.S. Appl. No. 10/180,195, filed Jun. 26, 2002, Final Office Action dated Jun. 6, 2005.
U.S. Appl. No. 10/180,195, filed Jun. 26, 2002, Office Action dated Nov. 19, 2004.

* cited by examiner

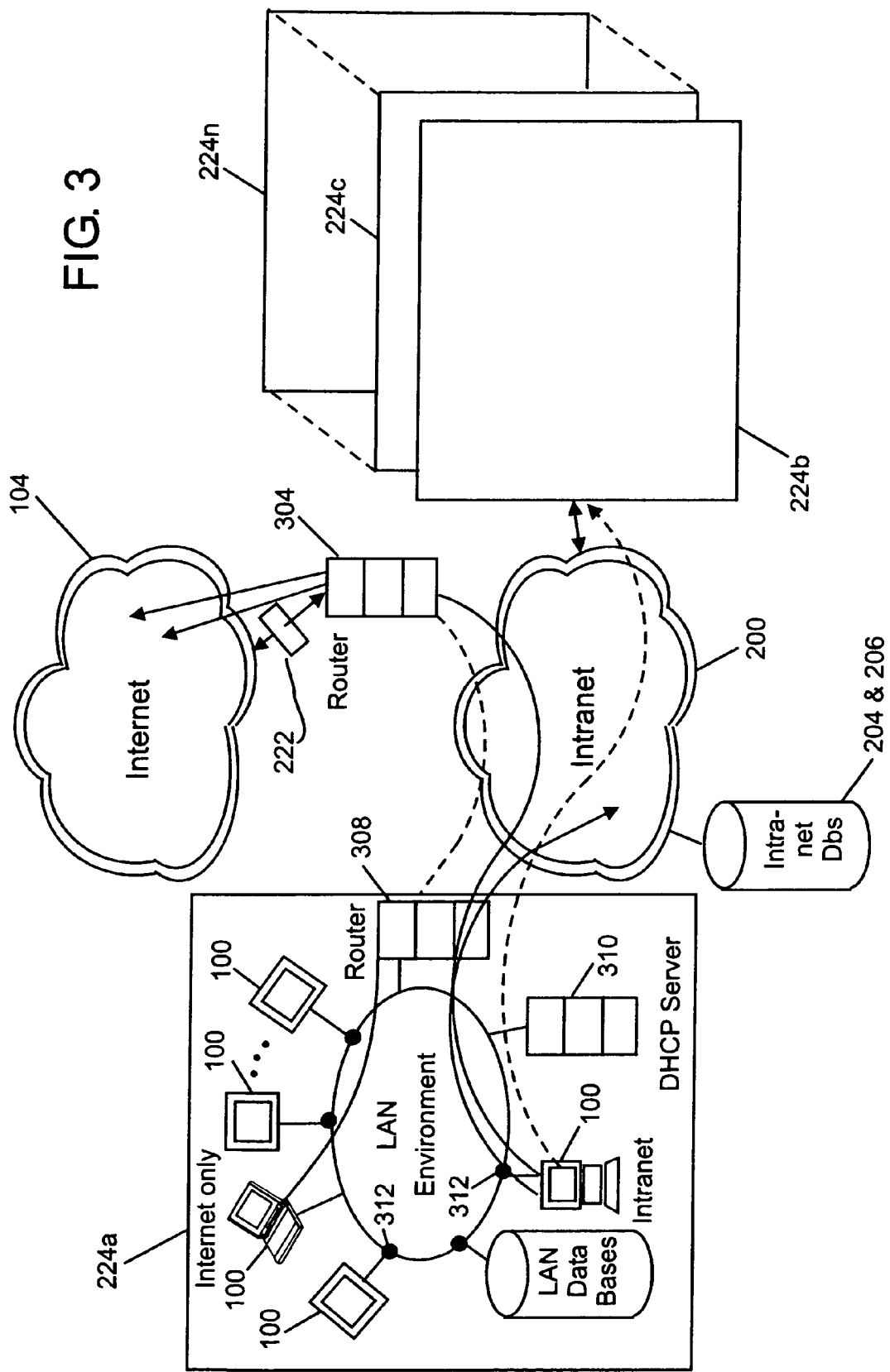

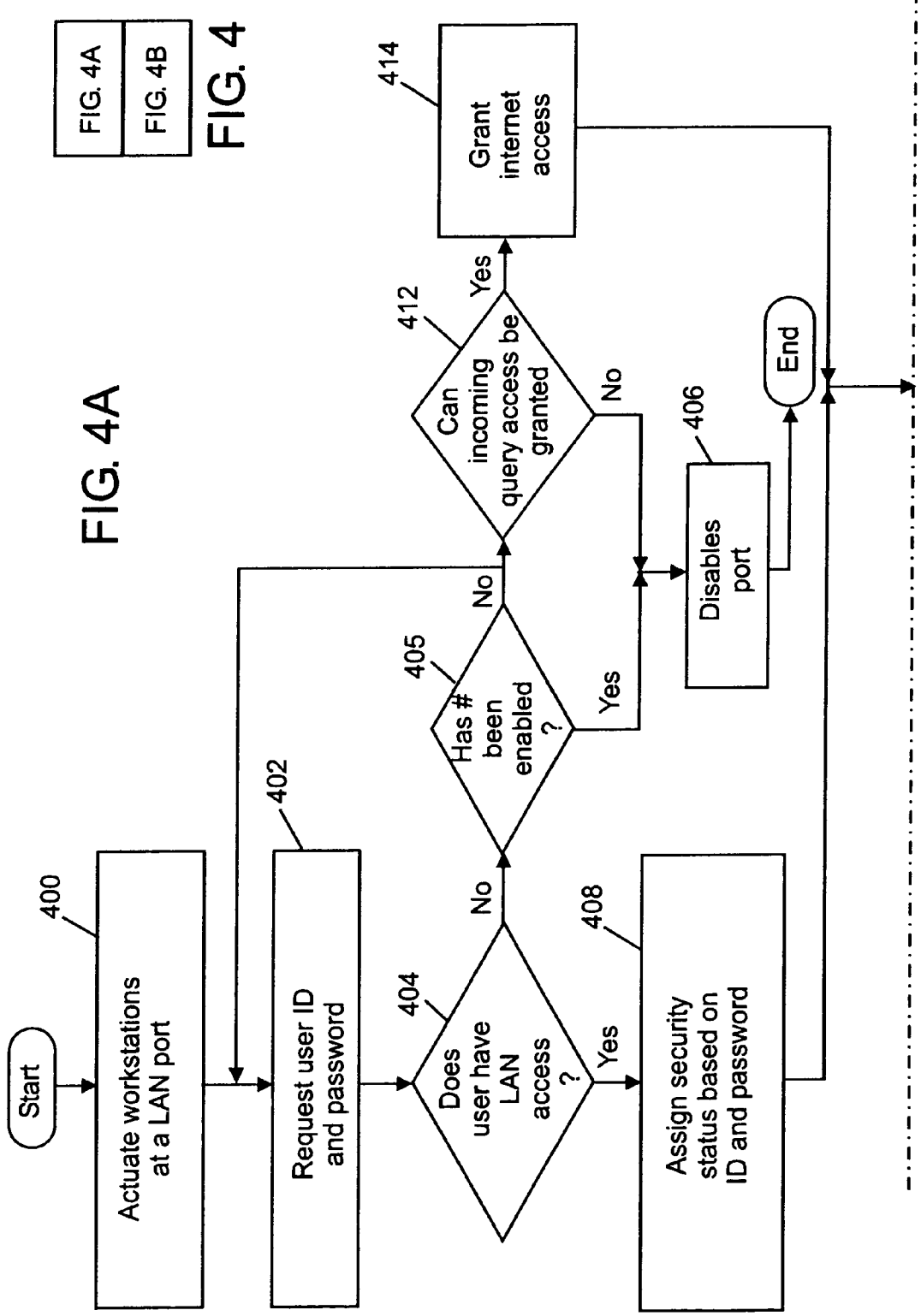

FIG. 5A

METHOD OF SECURING ACCESS TO IP LANS

RELATED APPLICATIONS

The contents of the following listed applications are hereby incorporated by reference:

(1) U.S. patent application Ser. No. 10/157,243, filed on May 30, 2002 and entitled "Method and Apparatus for Providing Multiple Views of Virtual Documents" which application was published on Dec. 4, 2003 as Publication #US20030225722A1.

(2) U.S. patent application Ser. No. 10/159,373, filed on Jun. 3, 2002 and entitled "A System and Method for Generating and Retrieving Different Document Layouts from a Given Content" which application has now issued as U.S. Pat. No. 7,254,571 on Aug. 17, 2007.

(3) U.S. patent application Ser. No. 10/180,195, filed on Jun. 27, 2002 and entitled "Retrieving Matching Documents by Queries in Any National Language" which application has now issued as U.S. Pat. No. 7,260,570 on Aug. 21, 2007.

(4) U.S. patent application Ser. No. 10/202,564 filed on Jul. 23, 2002 and entitled "Method of Search Optimization Based on Generation of Context Focused Queries" which application was published Jan. 29, 2004 as Publication #US20040019588A1.

(5) U.S. patent application Ser. No. 10/209,619 filed on Jul. 31, 2002 and entitled "A Method of Query Routing Optimization" which application has now issued as U.S. Pat. No. 7,143,085 on Nov. 28, 2006.

(6) U.S. patent application Ser. No. 10/066,346 filed on Feb. 1, 2002 and entitled "Method and System for Searching a Multi-Lingual Database" which application has now issued as U.S. Pat. No. 6,952,691 on Oct. 4, 2005.

(7) U.S. patent application Ser. No. 10/229,552 filed on Aug. 28, 2002 and entitled "Universal Search Management Over One or More Networks" which application has now issued as U.S. Pat. No. 7,092,938 on Aug. 15, 2006.

(8) U.S. patent application Ser. No. 10/302,108 filed on Nov. 22, 2002 and entitled "An International Information Search and Delivery System Providing Search Results Personalized to a Particular Natural Language" which application has now issued as U.S. Pat. No. 7,039,625 on May 2, 2006.

(9) U.S. patent application Ser. No. 10/412,808 filed on Apr. 11, 2003 and entitled "Dynamic Comparison of Search Systems in a Controlled Environment."

FIELD OF THE INVENTION

The present invention relates to network security in secured intranet work sites connected to the internet. More particularly, it relates to security from access of protected information the secured network from within the secured site by unauthorized users.

BACKGROUND OF THE INVENTION

In a protected intranet site, it is desirable that a local area network (LAN) be provided with two or more service classes. One of the service classes could be a broad service class which could permit access to the LAN, the internet and an intranet containing the LAN. Other service classes would limit access to one or more of the LAN and the intranet In a LAN, a user is assigned a workplace location identified by a LAN address (MAC) and logical address (IP). Based on the user's personal identification (ID) on the intranet, the MAC and IP addresses are assigned a level of access to the networks and the information in them. However, this mode of protection can be defeated by a procedure called "Spoofing" where a user masquerades as someone else on the intranet and bypasses several levels of security. An example of spoofing would be to change a LAN work station location from one physical address and/or logical address to another after access has been obtained for the work station.

Therefore it is an object of the present invention to improve network security and/or accessibility in security in secured intranet work sites.

It is further an object of the present invention to provide increased security protection for such intra work sites by unauthorized users using insecure work site.

BRIEF DESCRIPTION OF THE INVENTION

In accordance with the present invention, protection against spoofing is provided in a LAN which has at least two service classes, one access class that allows access to the LAN, the internet, and a intranet containing the LAN and the other class which allows access to the LAN and the internet but not the intranet. A user gains access to the LAN using his/her ID which identifies the user as having broad access that includes access to intranet databases or more limited access which excludes access to the intranet databases. To prevent limited access users from gaining access to the intranet databases by changing addresses, the LAN continuously performs periodic checks for address changes at a rate which insures the check proceeds any data request. If there is an address change, the port assigned to the user and/or the one he/she is using is disabled throwing the user off the LAN without obtaining the requested data.

DESCRIPTION OF THE DRAWINGS

FIG. 3 is a schematic diagram showing arrangement of LANs within the private network of FIG. 2;

DETAILED DESCRIPTION OF THE INVENTION

Figure 1:
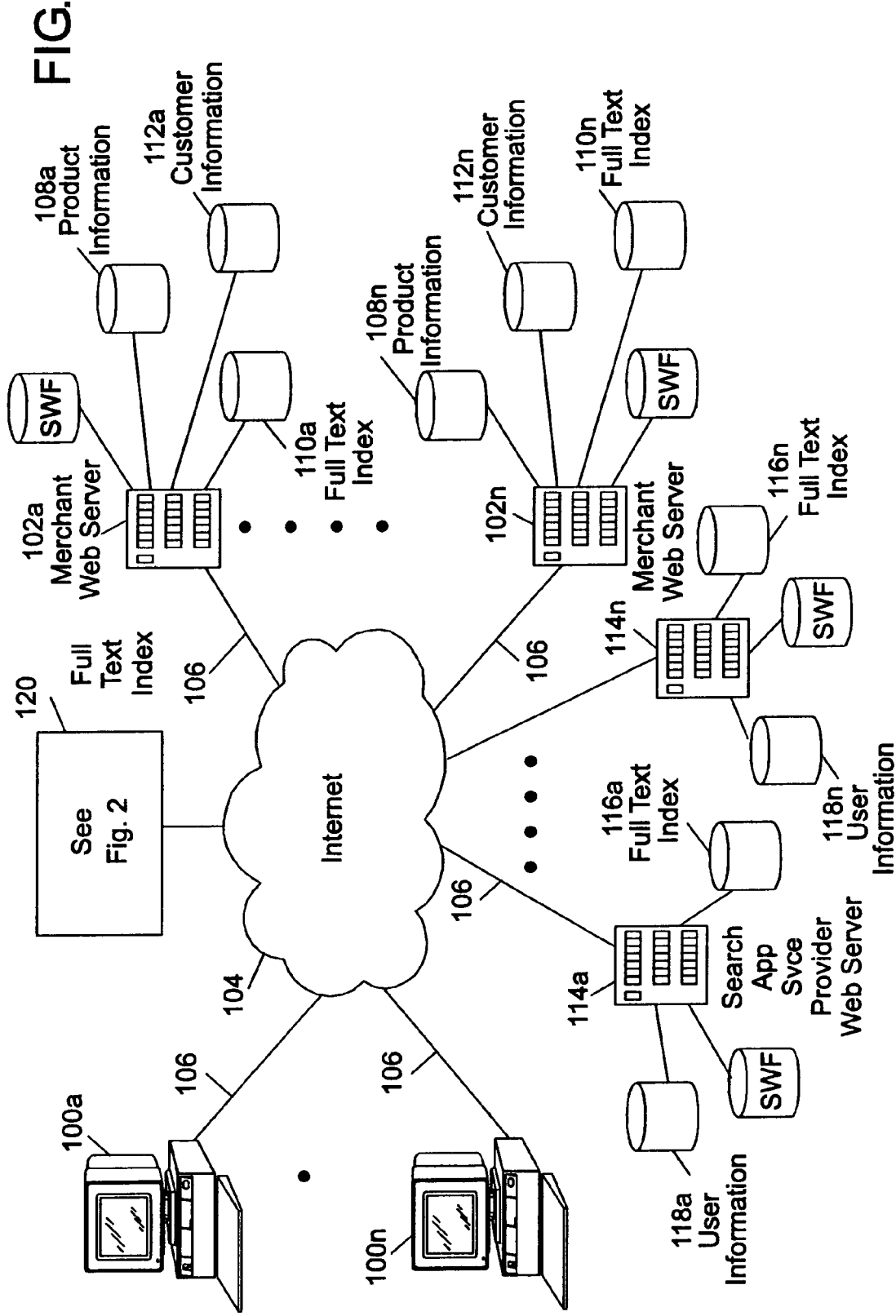
FIG. 1 is a schematic diagram for system organization of an on-line area network.

Referring now to FIG. 1, communication between a plurality of user computers 100a to 100n and a plurality of information servers 102a to 102n is accomplished via an on-line service through a wide area network such as the Internet 104 that includes network node servers. The network node servers manage network traffic such as the communications between any given user's computer and an information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 1, and discussed hereafter, are those of merchants which, for a fee provide products, services and information over the Internet. While the following discussion is directed at communication between shoppers and such merchants over the Internet, it is generally applicable to any information seeker and any information provider on a network. (For instance, the information provider can be a library such as a University library, a public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114a to 114 of plurality of search service providers, such as Google of Google, Inc., which providers maintain full text indexes 116 of the products of the individual merchants 102a to 102n obtained by interrogating the product information databases 108 of the individual merchants. Some of these search service providers, like Google, are general purpose search providers while others are topic specific search providers.

The merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g. age, occupation, address, hobbies) regarding the shopper as provided by the shopper when subscribing to the service or obtained from other sources. Profile data can help in discerning the meaning of words used in a keyword query. For instance, a keyword in the query of a medical doctor could have an entirely different meaning to the use of the same keyword presented by a civil engineer. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the space provided on the default or home page of his/her browser, the search engine of the merchant web server 102 does a search of the accessed full text index database 110 or 118 using the key words and gets a list of documents describing those products and services that contain matches to the key words. This list of documents contain basic test ranking Tf (including the number of hits, their location, etc. which are used to order the list of documents) with documents with higher scores at the top. This list is then sent to a ranking module which will apply a ranking algorithm, such as the one described in the article entitled "The Anatomy of a Large-Scale Hypertextual Web Search Engine" by Sergey Brin and Lawrence Page of the Computer Science Department, Stanford University, Stanford Calif. 94305 (which article is hereby incorporated by reference) to rank the list of documents using the text factors and other rank factors, such as link analysis, popularity, the user's preferences from the users profile, and may also introduce factors reflecting the information, providers biases and interests. A reordered list of documents based on the ranking algorithm is then provided to the user.

Figure 2:
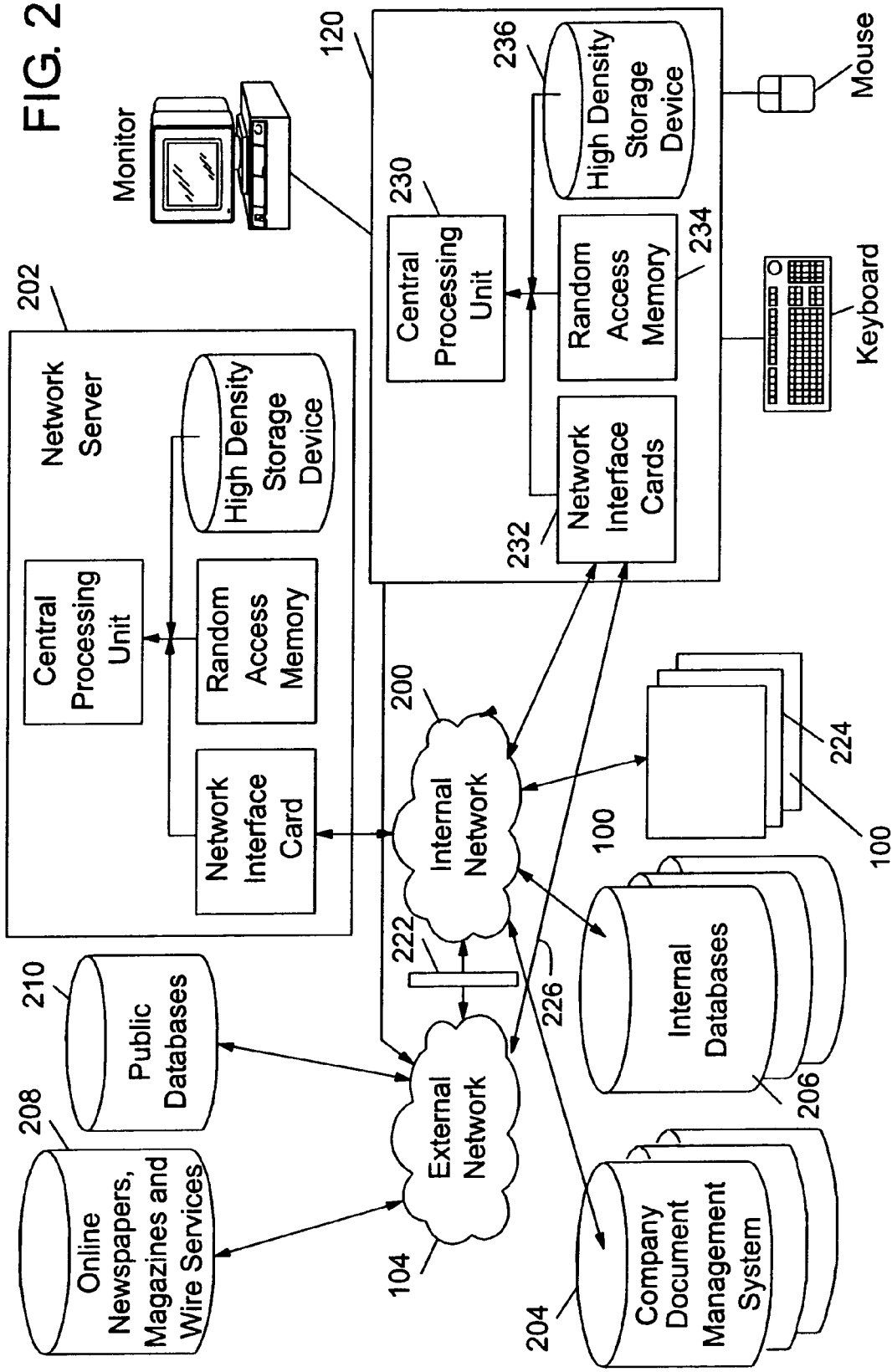
FIG. 2 is a schematic diagram of a private network incorporating the present invention and connected to the network shown in FIG. 1.

FIG. 2 shows how an intranet search management server 120 can be used as one of the merchants web server 120 of FIG. 1 which is incorporated into a merchant's internal network to obtain information from the merchant and supply it to a user. As shown in FIG. 2, the server 120 is connected in the private intranet network 200 which has a network server 202 and a number of computers 100, such as those described in FIG. 1, arranged on multiple 1 LANS 224 so that the computers 100 can obtain information stored in the internal sources of the private intranet. The LANS 224 can be located at a number of different internal corporate sites.

The search management server 120 contains an integrated search management system which receives queries and information from search engines both in the intranet and internet and accesses information sources that are in the intranet and internet through the computers 100. The integrated management server contains a central processing unit 230, network interfaces 232 and sufficient random access memory 234 and high density storage 236 to perform its functions. In addition to its connection to the intranet, the search management system contains a direct link 226 to the internet to enable access of certain merchant data files by customers of the merchant.

The intranet 200 is provided with public internet access capability which provides access to services on the public internet 104. Except for access through the search management system, a "firewall" 222 separates the public internet 104 from the private intranet 200 allowing only those with the proper ID and password to enter the intranet 200 from the public internet 104. Internal sources of the intranet 200 are company document management systems 204, and internal databases 206.

While firewall 222 and virus protection software can protect against intruders from the external network 104, there is still the problem from users of these LANs of the intranet. As best shown in FIG. 3, the internal sites of a corporation contain a significant number of LANs 224a to n, where each LAN is devoted to a specific corporate site location and/or to a specific purpose of the corporation, such as development of new products, marketing analysis and corporate business information. The corporate intranet 200 is coupled to the internet 104 through a router 304. Also, the connections to various LANs through a router of the particular LAN 308. In each of the LANs 224 there is a dynamic host control (DHCP) server 310 which controls that LAN's operation and access to the LAN and instructs the router to direct traffic between workstations 100 at ports 312 of the LAN and the intranet, the internet and other LANs on the internet. At various LANs at locations within the corporation, there are various categories of users. Some users would have access to the information on the internet, intranet and that LAN, such as regular corporate employees. Other users would have restricted access to information on a particular LAN and access to the internet without any access to the intranet and its resources 204, 206. An example of such a user would be a subcontractor's employee. Other groups of people would have more restricted access. For instance, visitors may be limited to only access on the internet. Other individuals may have greater access than most employees have to corporate information. For instance, workers on two LANs cooperating to produce a new product may share access to their databases.

A problem encountered with such an arrangement to multiple security levels is restraining people's access to their assigned security level. This problem exists whether access is assigned statically where a port always has the same access restrictions, or preferably dynamically where a port's access restrictions are determined from the users ID.

Figure 4B:
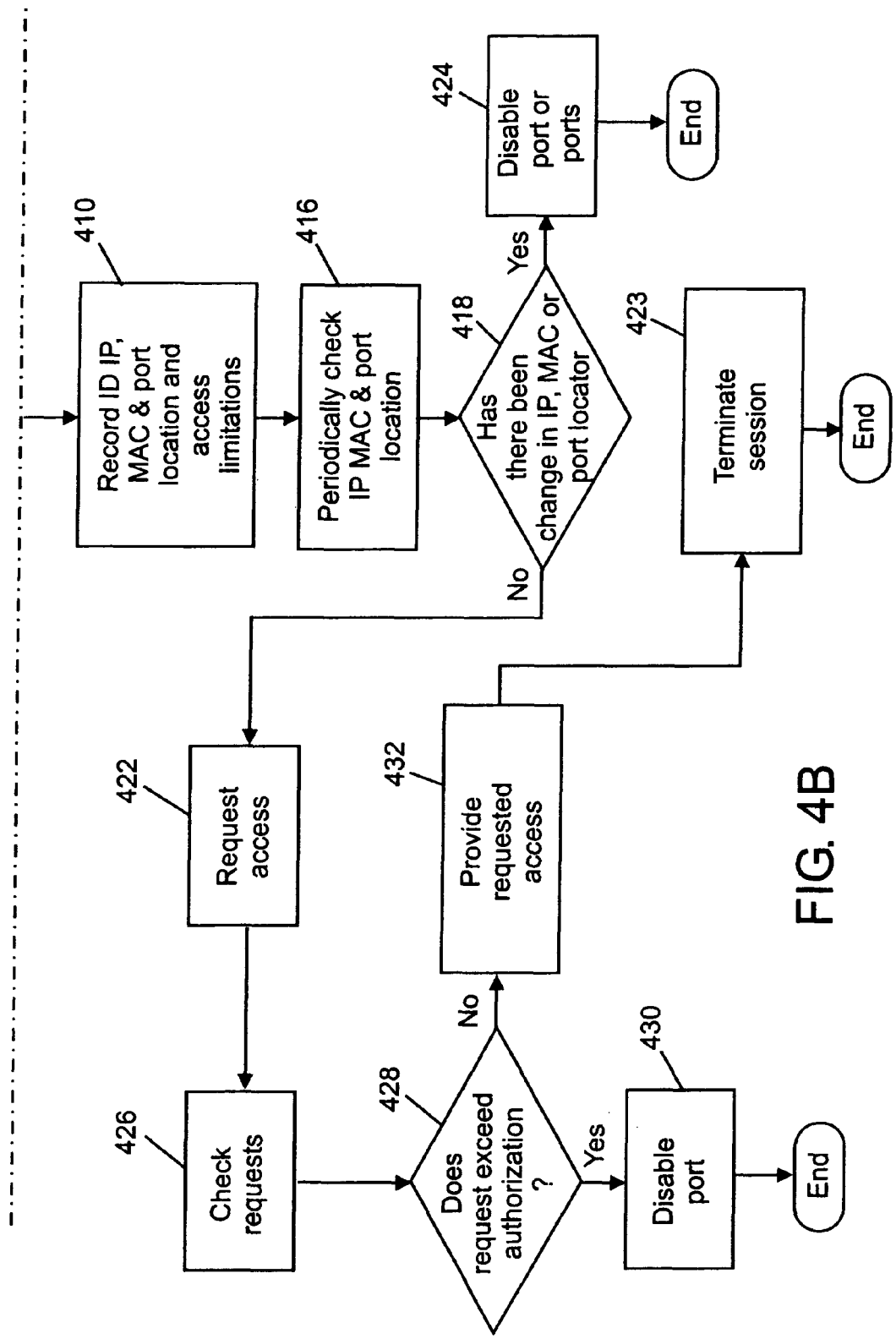
FIG. 4 is a flow diagram of software of the present invention for use on a LAN with dynamic site application.

Referring now to FIG. 4, when a user tries to establish communication from a workstation over LAN ports in step 400, the machine requests the user ID and a password for the user in step 402. The software on the DHCP server determines whether the user has LAN access in step 404 and if not, it is determined by step 405 that the number of permitted tries have been exceeded and disables the port in step 406. If the number of tries has not been exceeded, the user is given another try to gain access. If access is granted, he can proceed as if initially granted to step. If it turns out the user can be granted access to the LAN, software on the DHCP server determines the limitations on that access in step 408. This would involve looking up the user's ID on the intranet to determine his security status with its limitations and if not already done so, store them in the DHCP along with the user's ID, his IP and his MAC address in step 410.

If the user is a visitor, he/she may obtain a temporary ID which would provide limited access out of the intranet to the internet only, in steps 412 and 414, so that he can communicate through the internet as if he were any other internet user. In this case, communication back to the interne or to a particular LAN, other LANS and other intranet sites would be through the firewall.

Each of the LAN port sites are periodically checked in steps 416 and 418 to see if the MAC IP and the ID assigned to that port site are the ones using the port. That is if a user would try to change ports to obtain less limited access this would be noted and the system in step 420 would disable the port and notify security. The reasons for changing ports may be proper but the risk of losing valuable corporate data outweighs any inconveniences caused by the disabling of the port. This includes checking the users security data in the LAN and intranet database one against the other to see if they compare. The periodic checking is rapid to assure that a check always proceeds a user's request for data If the port is used properly and there is no address changes or any differences between the user's security level data in the LAN and intranet databases, use of the port 422 can be continued until access is terminated by the user in step 423. The requests are checked in steps 426 and 428 to see if they are proper. If not, the port is disabled. If they are, proper access is provided in step 432.

Figure 5:
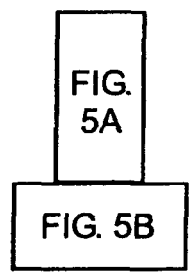
FIG. 5 is a schematic diagram showing software for the present invention for use in connection with a LAN having fixed site applications.
Figure 5B:
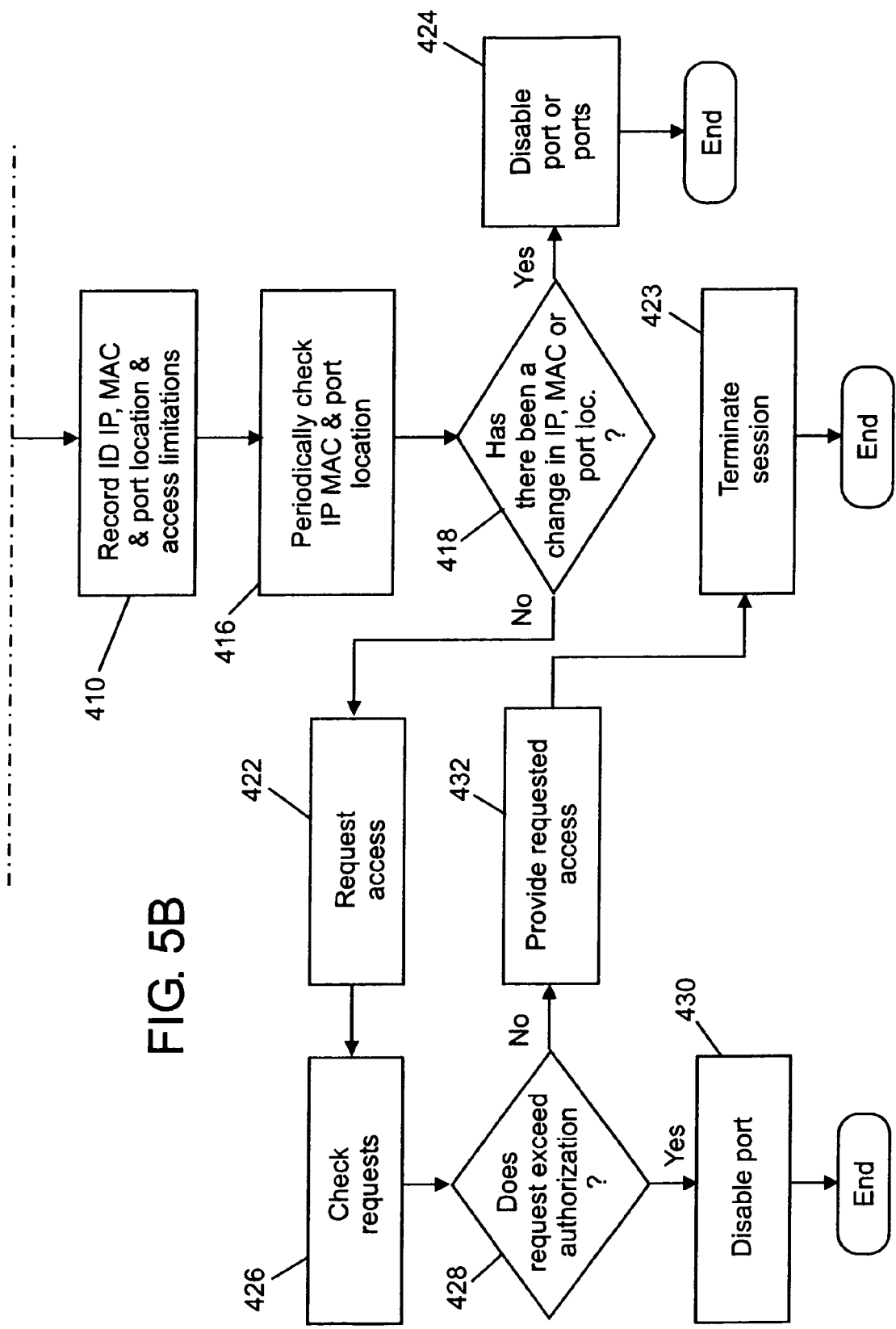

The embodiment described above is for dynamically assigned port use restrictions. In certain LANs, the restrictions are fixed for particular ports which would enable a visitor to use a port with only access to the internet, a subcontractor to use a port which would be limited to access to the LAN and the internet and an employee of the corporation to use a less restricted port for the LAN. In FIG. 5, steps with functions similar to those in FIG. 4, are assigned the same number. The difference being, the two systems the step of determining in step 500 if the user is on a proper port and if not, informing the user that he should change his port in step 502 to one appropriate for the restrictions of his use. Once on a proper port, the user must provide requested user ID and password in step 402 to continue the process.

Above we have described one embodiment of the invention and modifications of this embodiment may be apparent to those skilled in the art. For this reason it should be understood that the present invention is not limited to the described embodiments but includes all changes that fall within the spirit and scope of the appended claims.

The invention claimed is:

1. A system for internal and Internet communication comprising:
    an intranet with a connection through a firewall to the internet;
    a plurality of databases requiring differing user security authorization levels to access their contents on the intranet;
    an intranet security database listing of clearance levels for intranet users having a user ID and active codeword along with their assigned port locations identified by their MAC and IP addresses;
    a plurality of LANs within the intranet each having a separate security system response to a user ID and codeword in the intranet security database to any intranet user to assign a LAN port location to the any user and to provide periodic comparisons of the any user's MAC and IP address while on-line against the any user's assigned port location MAC and IP addresses at a rate that a periodic comparison precedes any request of the any user for data in order to detect switching of ports by the any user prior to the accessing of any data by the any user wherein during the periodic comparisons the LAN security system compares data in its listings of LAN port locations in present use with the data for assigned LAN port locations of present users for disparities in assigned and on-line address locations of the any user; and
    at least one computerized component configured to perform the following:
        have the LAN security system assign a security ratings to port sites;
        check the user ID and password of a prospective user of a particular port site to determine whether the user is an approved LAN user;
        check the security level of the prospective user against the assigned security rating of the particular port site;
        assign use of the particular port site to the prospective user in the case that the prospective user is an approved LAN user and has the appropriate security level at least matching the security level of the particular port site;
        direct the prospective user to use a proper port site with a lower security rating in the case that the prospective user is an approved LAN user but does not have the appropriate security level to access the particular port site;
        record IP and MAC of the particular port assigned to the prospective user;
        use the recorded data to periodically compare an on-line port location of the prospective user against the user's assigned particular port site at a rate that assures the check proceeds the prospective users request for data;
        shut down the prospective user's assigned port and used port location to prevent the transfer of data when the on-line port location is not the assigned port location of the prospective user; and provide access when the on-line port location of the prospective user is the same as the location assigned the prospective user.

2. The system of claim 1, wherein the security system of any LAN disables any used port of that any LAN when any one of the periodic comparisons of that any used port does not show identity of data with the users assigned port location.

3. The system of claim 2, wherein the LAN security system assigns the port sites with fixed security ratings.

4. The system of claim 3, wherein the security system of a LAN assigns a security rating to a LAN port site based on a security level for a particular user previously assigned that port site.

5. A method for maintaining security in intranet and internet communication comprising:

providing a plurality of databases requiring differing user security levels to access their contents on the intranet;

an intranet security data base listing clearance levels for intranet users with a user ID and an active codeword along with a listing of approved LAN users with their port locations by their MAC and IP addresses;

a LAN within the intranet having a security system responsive to a user ID and a codeword in the intranet security database to assign a port location of the LAN to the users;

using the security system to continuously provide periodic comparisons of MAC and IP addresses of active users currently accessing the LAN against the assigned port locations of the active users to detect any active user switching ports from the active user's assigned port location to a port location with a less restrictive clearance level;

responding to the periodic comparisons of the LAN security system by disabling one or more ports when a comparison does not show identity of data of the any active users presently used and assigned port locations;

having the LAN security system assign security ratings to port sites;

checking the user ID and password of a prospective user of a particular port site to determine whether the user is an approved LAN user;

checking the security level of the prospective user against the assigned security rating of the particular port site;

assigning use of the particular port site to the prospective user in the case that the prospective user is an approved LAN user and has the appropriate security level at least matching the security level of the particular port site;

directing the prospective user to use a proper port site with a lower security rating in the case that the prospective user is an approved LAN user but does not have the appropriate security level to access the particular port site;

recording IP and MAC of the particular port assigned to the prospective user;

using the recorded data to periodically compare an on-line port location of the prospective user against the user's assigned particular port site at a rate that assures the check proceeds the prospective users request for data;

shutting down the prospective user's assigned port and used port location to prevent the transfer of data when the on-line port location is not the assigned port location of the prospective user; and providing access when the on-line port location of the prospective user is the same as the location assigned the prospective user.

6. The method of claim 5, wherein the LAN security system assigns the port sites with various fixed security ratings.

7. The method of claim 5, wherein the LAN security system assigns a security rating to a port site based on a security rating of a user assigned that port site.

8. A computer program product on at least one non-transitory computer medium for intranet and internet communication, the program product executing on a processing system and comprising:

computer code for a plurality of databases requiring differing security clearance levels to be accessed by users on the intranet;

an intranet security database listing clearance levels for intranet users, having a user ID and an active codeword, with their assigned port locations identified by their MAC and IP addresses;

computer code for LANs within the intranet, each LAN having a separate security system response to user IDs and codewords in the intranet security database to assign LAN port locations to users;

computer code to provide continuous periodic comparisons of MAC and IP port addresses currently active on the LANs against the assigned port locations of the users on the LANs to detect any of the users switching ports to prevent unauthorized access by any of the users of one or more of the databases;

computer code to perform the following:

have the LAN security system assign security ratings to port sites;

check the user ID and password of a prospective user of a particular port site to determine whether the user is an approved LAN user;

check the security level of the prospective user against the assigned security rating of the particular port site;

assign use of the particular port site to the prospective user in the case that the prospective user is an approved LAN user and has the appropriate security level at least matching the security level of the particular port site;

direct the prospective user to use a proper port site with a lower security rating in the case that the prospective user is an approved LAN user but does not have the appropriate security level to access the particular port site;

record IP and MAC of the particular port assigned to the prospective user;

use the recorded data to periodically compare an on-line port location of the prospective user against the user's assigned particular port site at a rate that assures the check proceeds the prospective users request for data;

shut down the prospective user's assigned port and used port location to prevent the transfer of data when the on-line port location is not the assigned port location of the prospective user; and provide access when the on-line port location of the prospective user is the same as the location assigned the prospective user.

9. The computer program product of claim 8, wherein the computer code for the LAN security system disables any port when the comparisons do not show identity of data.

10. The computer program product of claim 9, wherein the computer code for the LAN security system assigns a fixed security rating to the port sites.

11. The computer program product of claim 9, wherein the computer code for the LAN security system assigns a security rating to a port site based on the security rating of a user assigned to that port site.

12. The system of claim 3, wherein the security system directs the any user using a port site exceeding the any user's assigned security level to a port site appropriate for the any user's security level.

13. The system of claim 4, wherein a LAN security system is run on a DHCP.

14. The method of claim 5 including the step of disabling the any user's assigned port and the port presently in use by the any user where there is no identity of data.

15. The method of claim 5 including the step of disabling the port presently in use by any one of the any active users when there is no identity of data.

16. The method of claim 5 including the step of disabling the any one of the active user's assigned port location when there is no identity in data.

17. The method of claim 14, wherein the periodic comparisons precedes any request for data by the any one of the active users.

\* \* \* \* \*